(12) United States Patent
Und (10) Patent No.: US 12,212,902 B2
(45) Date of Patent: Jan. 28, 2025

(54) CABLE MANAGER

(71) Applicant: Drägerwerk AG & Co, KGaA, Lübeck (DE)

(72) Inventor: Peter Andrew Und, Nashua, NH (US)

(73) Assignee: Drägerwerk AG & Co, KGaA (DE)

(*) Notice: Subject to any disclaimer, the term of this patent is extended or adjusted under 35 U.S.C. 154(b) by 103 days.

(21) Appl. No.: 16/771,615

(22) PCT Filed: Dec. 10, 2018

(86) PCT No.: PCT/US2018/064699
§ 371 (c)(1),
(2) Date: Jun. 10, 2020

(87) PCT Pub. No.: WO2019/118326
PCT Pub. Date: Jun. 20, 2019

(65) Prior Publication Data
US 2020/0359112 A1      Nov. 12, 2020

Related U.S. Application Data (60) Provisional application No. 62/597,362, filed on Dec. 11, 2017.

(51) Int. Cl.
*H04Q 1/06* (2006.01)
*H04Q 1/02* (2006.01)

(52) U.S. Cl.
CPC ............. *H04Q 1/062* (2013.01); *H04Q 1/068* (2013.01); *H04Q 1/09* (2013.01)

(58) Field of Classification Search
CPC .. F16L 3/13; H04Q 1/068; H04Q 1/09; H04Q 1/062; A61B 90/50; A61B 50/10;
(Continued)

(56) References Cited

U.S. PATENT DOCUMENTS 4,141,524 A * 2/1979 Corvese, Jr. .............. F16L 3/00
                                                           5/503.1
4,571,182 A * 2/1986 Beier ..................... A61G 15/14
                                                            433/79
(Continued)

OTHER PUBLICATIONS

European International Search Report and Written Opinion of the International Searching Authority, mailed Feb. 25, 2019, for PCTUS2018/064699.

*Primary Examiner* — Patrick D Hawn
(74) *Attorney, Agent, or Firm* — Design IP (57) ABSTRACT

A system includes a rigid housing and flexible tubes. The rigid housing includes cable receptacles. Each cable receptacle has a distal end and a longitudinal opening configured to accept a cable. The flexible tubes are configured to accept cables and orient the cables in a customizable, organized manner. Each flexible tube is secured to a respective cable receptacle at the distal end and has a longitudinal opening oriented to align with the longitudinal opening of the respective cable receptacle. Another system includes a vertical stand structure configured to maneuver about a floor and a deformable trough secured to the vertical stand structure. The deformable trough is configured to initially bend in a customizable manner to form a customized configuration and subsequently maintain the customized configuration to facilitate placement of the cables within the deformable trough and provide for mobility of the vertical stand structure.

16 Claims, 8 Drawing Sheets

(58) Field of Classification Search
CPC ......... A61B 50/13; A61B 50/15; A61B 50/20; A61B 2050/155
USPC ...................................................... 211/85.13
See application file for complete search history.

(56) References Cited

U.S. PATENT DOCUMENTS

| | | | | |
|---|---|---|---|---|
| 4,707,906 A * | 11/1987 | Posey | ................... | F16L 3/223 24/339 |
| 5,027,478 A * | 7/1991 | Suhr | ................... | F16L 3/223 24/339 |
| 5,135,189 A * | 8/1992 | Ghazizadeh | ......... | F16M 13/022 248/104 |
| 5,309,604 A * | 5/1994 | Poulsen | ................ | F16L 3/223 24/339 |
| 5,507,460 A * | 4/1996 | Schneider | ............. | F16L 3/223 24/601.2 |
| 5,957,352 A * | 9/1999 | Gares | ..................... | B25H 3/04 24/339 |
| 6,155,439 A * | 12/2000 | Draughn | ............... | A61B 50/22 211/85.13 |
| 6,375,017 B1 * | 4/2002 | Schattner | ............ | A61M 5/1418 604/80 |
| 6,629,615 B2 * | 10/2003 | Kim | ....................... | F16L 3/223 211/85.13 |
| 7,490,837 B2 * | 2/2009 | Pond | ...................... | A61B 17/00 433/79 |
| 7,503,901 B2 * | 3/2009 | Behague | .......... | A61B 5/150389 604/905 |
| 7,918,828 B2 * | 4/2011 | Lundgaard | ............. | F16L 3/223 604/179 |
| 8,014,170 B2 * | 9/2011 | Mori | ..................... | G06F 3/0227 174/53 |
| 8,069,998 B2 * | 12/2011 | Thomas | ................. | A61B 50/34 206/370 |
| 8,167,252 B2 * | 5/2012 | Nitsche | ..................... | F16L 3/24 24/339 |
| 8,361,040 B2 * | 1/2013 | Spohn | ............... | A61M 5/14546 604/174 |
| 9,033,162 B2 * | 5/2015 | Brotzman | .............. | A61B 50/15 211/126.14 |
| 9,534,708 B2 * | 1/2017 | Cripps, II | ............... | F16L 3/221 |
| 9,951,888 B2 * | 4/2018 | Boriack | .................... | F16L 3/13 |
| 9,999,719 B2 * | 6/2018 | Kitchen | .............. | A61M 5/1415 |
| 10,271,918 B2 * | 4/2019 | Chow | .................... | A61B 50/22 |
| 10,493,243 B1 * | 12/2019 | Braham | ................ | A61M 25/02 |
| 10,582,981 B2 * | 3/2020 | Childs | ....................... | H02B 1/26 |
| 10,583,242 B2 * | 3/2020 | Corato | ............... | A61M 5/1418 |
| 10,786,641 B1 * | 9/2020 | Patraka | ................. | A61J 15/0061 |
| 10,850,025 B2 * | 12/2020 | Bulloch | .............. | A61M 5/1418 |
| 10,862,244 B2 * | 12/2020 | Sze | ....... | F16G 11/044 |
| 10,945,803 B2 * | 3/2021 | Recanati | ................ | A61B 46/23 |
| 11,033,711 B2 * | 6/2021 | Coatsworth | ........... | A61B 90/94 |
| 11,083,867 B2 * | 8/2021 | Otake | ................. | A61M 25/002 |
| 2004/0118982 A1 * | 6/2004 | Shillings | ................ | F16L 3/223 248/68.1 |
| 2005/0247478 A1 * | 11/2005 | McGrath | ................ | H04Q 1/064 174/68.1 |
| 2005/0265013 A1 * | 12/2005 | Keith | ..................... | H04Q 1/023 361/826 |
| 2007/0039755 A1 | 2/2007 | Mori et al. | | |
| 2007/0187555 A1 * | 8/2007 | Rabanin | ..................... | F16L 3/13 248/49 |
| 2009/0163043 A1 * | 6/2009 | Demers | ................. | H04Q 1/062 439/43 |
| 2010/0174415 A1 * | 7/2010 | Humayun | .............. | A61B 90/98 137/565.17 |
| 2010/0217113 A1 | 8/2010 | Jenkins et al. | | |
| 2011/0084039 A1 * | 4/2011 | Walters | ................. | A47F 7/0028 248/65 |
| 2012/0172850 A1 * | 7/2012 | Kappel | .............. | A61B 1/00149 606/1 |
| 2013/0068711 A1 * | 3/2013 | Sebastian | ............. | A61B 90/50 211/85.13 |
| 2015/0068941 A1 * | 3/2015 | Caron | .................. | A61M 25/002 206/364 |
| 2016/0000993 A1 * | 1/2016 | Endyk | .................. | A61M 5/008 211/85.13 |
| 2016/0029877 A1 * | 2/2016 | Murphy | .................. | A61B 1/0014 211/85.13 |
| 2016/0089204 A1 * | 3/2016 | Chow | ................... | A61M 25/02 224/217 |
| 2021/0128269 A1 * | 5/2021 | Vipperman | ............ | A61B 90/50 |

\* cited by examiner

CABLE MANAGER

CROSS REFERENCE TO RELATED APPLICATION

This application claims priority to U.S. Application No. 62/597,362, filed on Dec. 11, 2017, the contents of which is incorporated herein in its entirety.

TECHNICAL FIELD

The subject matter described herein relates to cable managers for managing a plurality of cables connected to a device.

BACKGROUND

During the course of providing healthcare to patients, practitioners typically monitor patient medical parameters of a patient using one or more monitoring devices. These are usable by healthcare practitioners (e.g., nurses, doctors, physician assistants, or any other person charged with providing a healthcare service to a patient) in monitoring a patient and determining a course of healthcare to be provided to the patient. Patient monitoring devices can have numerous cables which can transport power and/or patient medical parameters of a patient receiving a healthcare service. Such cables can be of differing lengths and/or can have slack depending upon the proximity of the patient to the patient monitoring device. As a result, the numerous cables can cause for a disorganized patient environment as the cables can be draped across other equipment within the environment complicating and/or preventing use of such equipment, cause tripping hazards within the environment, and/or can easily become inadvertently disconnected from the patient monitoring device.

SUMMARY

A system for managing a plurality of cables includes a rigid housing having a plurality of cable receptacles and a plurality of flexible tubes. The plurality of cable receptacles can extend perpendicular from a face of the rigid housing. Each cable receptacle has a distal end and a longitudinal opening configured to accept a cable of the plurality of cables. The plurality of flexible tubes are configured to accept the plurality of cables and orient the plurality of cables in a customizable, organized manner. Each flexible tube is secured to a respective cable receptacle at the distal end and has a longitudinal opening oriented to align with the longitudinal opening of the respective cable receptacle.

In some variations, a portion of the plurality of cable receptacles can be on a first side of the face and another portion of the plurality of cable receptacles can be on a second side of the face. The longitudinal opening of each cable receptacle can face in an outward direction from a center axis of the face.

In other variations, each cable receptacle can be a tubular structure. The longitudinal opening of each receptacle can extend lengthwise down a side of the tubular structure.

In some variations, the plurality of flexible tubes can each be bonded to the respective cable receptacle at the distal end using a flexible adhesive. The flexible adhesive can be an epoxy-based adhesive or a urethane-based adhesive. In other variations, the plurality of flexible tubes can each be secured to the respective cables receptacle at the distal end by at least one of a fastener mechanism, a tongue and grove mechanism, or a screw mechanism.

In other variations, the system further includes a mount configured to detachably couple to a device and a flexible arm coupled to and between the rigid housing and the mount. The mount can, in some variations, be a monitor mount configured to detachably couple to a patient monitoring device. The flexible arm can be configured to provide mobility of approximately 90 degrees for the rigid housing and the plurality of flexible tubes coupled thereto about a center axis of the patient monitoring device.

Each flexible tube, in some variations, can be color coded based on a type of parameter information transmitted by each respective cable. The plurality of flexible tubes can be a polypropylene material. Each flexible tube can also have a length of about 1 meter to 3 meters.

In other variations, the rigid housing can be of a thermoplastic material. The thermoplastic material can include at least one of polyester, nylon, polycarbonate acrylonitrile butadiene styrene, or polybutylene terephthalate.

In another aspect, a system for managing a plurality of cables includes a vertical stand structure configured to maneuver about a floor and a deformable trough secured to the vertical stand structure. The deformable trough is configured to initially bend in a customizable manner to form a customized configuration and subsequently maintain the customized configuration to facilitate placement of the plurality of cables within the deformable trough and provide for mobility of the vertical stand structure. The deformable trough can be a polypropylene material.

In some variations, the deformable trough, in the customized configuration, can form a channel having a bottom and at least two sides to facilitate placement of the plurality of cables within the channel. The at least two sides of the channel can provide for a customized channel width.

In other variations, the deformable trough can include a first portion, a second portion, and a middle portion between the first portion and the second portion. The first portion and the second portion can each be individually configured to form the customized configuration. In some variations, the vertical stand structure can include a mounting arm. The mounting arm can extend perpendicular to the vertical stand structure. The middle portion of the deformable trough can be affixed and secured to the mounting arm.

In some variations, the vertical stand structure can include an integrated handle at a first end of the vertical stand structure.

In other variations, the vertical stand structure can include a plurality of wheels at a second end of the vertical stand structure to facilitate maneuvering about the floor.

In either aspect, the plurality of cables can be in a patient environment. The patient environment can an anesthesia work environment. The plurality of cables can coupled to a patient monitoring device. The plurality of cables can include electrical cables and/or pneumatic cables.

The subject matter described herein provides many technical advantages. For example, the current subject matter provides both discrete and mobile cable management systems that allow a user to customize the placement and/or orientation of cables within an environment. This customized placement can allow for cables to be directed between a patient and patient monitoring device while avoiding unnecessary draping over other equipment within the environment. Such cable management systems can also provide for an increased hygienic working condition as the cables are controlled and can be easily maneuvered for cleaning.

Use of the cable management systems described herein can also contribute to ensuring that cables remain coupled to the patient and/or patient monitoring device.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Numerous cables within an environment can be managed using discrete or mobile cable management systems. For example, cables can be managed using a discrete cable management system having a rigid housing and flexible tubes so that the cables can remain secured to a device while also having customized orientations. Cables can also be managed using a mobile cable management system having a vertical stand structure and a deformable trough that the cables can be placed within. These cable management systems can provide for customized configurations of numerous cables within an environment that avoid other equipment within the environment.

Figure 1:
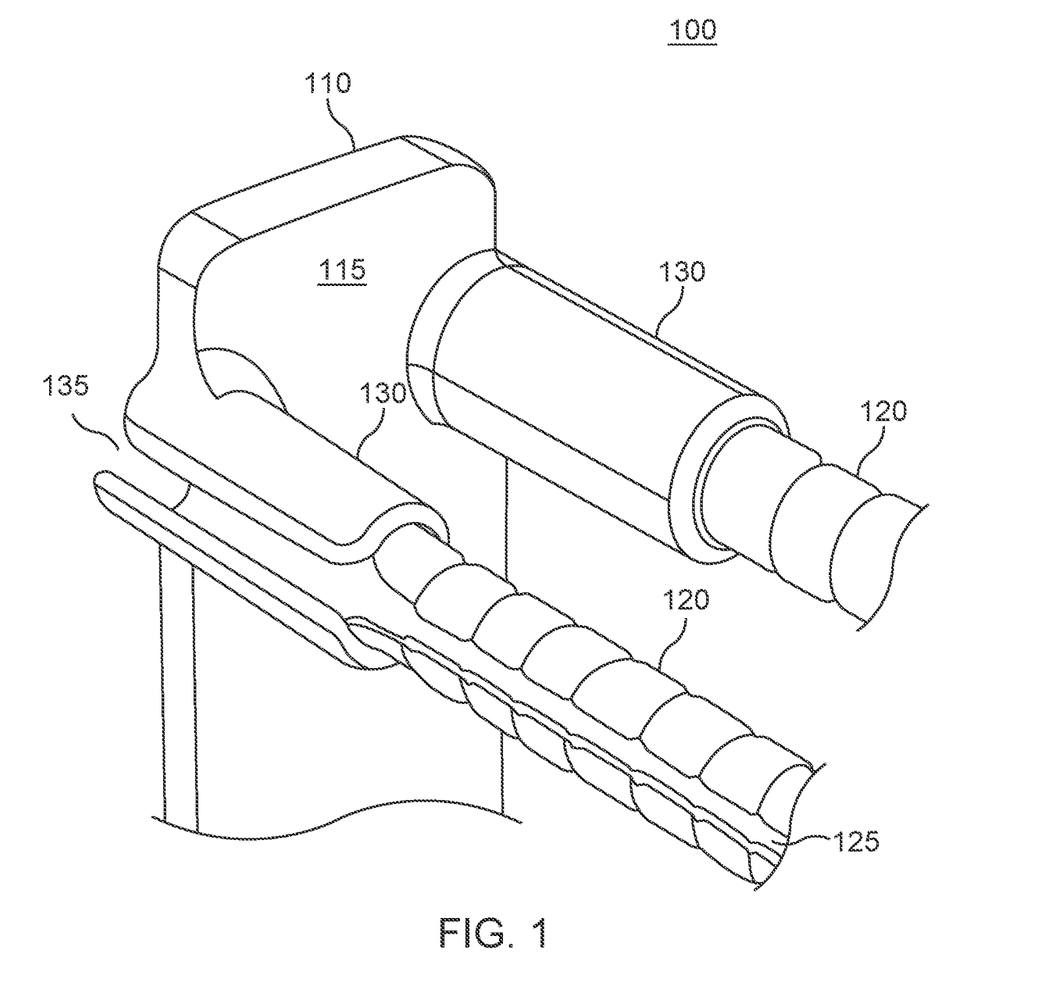
FIG. 1 is a diagram illustrating a discrete cable management system including a rigid housing and a plurality of flexible tubes.

FIG. 1 is a diagram of a cable management system 100 including a rigid housing 110 and one or more flexible tubes 120. Rigid housing 110 includes one or more cable receptacles 130 that extend perpendicular to a face 115 of rigid housing 110. Rigid housing 110 can be made of a thermoplastic material that is a high impact, chemically resistant material for use in a patient environment. For example, rigid housing 110 can be made up of one or more of polyester, nylon, polycarbonate acrylonitrile butadiene styrene, and/or polybutylene terephthalate.

Each cable receptacle 130 be can be a tubular structure having a longitudinal opening 135 that extends lengthwise down an entire length of the tubular structure. For example, in some variations, the longitudinal opening 135 of each cable receptacle 130 can face in an outward direction from a center axis of the face 115. As illustrated in FIG. 1, some cable receptacles 130 can be on a first side of at a perimeter of face 115 (e.g., left side) and some cable receptacles 130 can be on a second side of the face 115 (e.g., right side) at a perimeter of face 115. However, the positions of cable receptacles 130 on rigid housing 110 can vary from housing to housing and can be dependent upon the intended use of the housing.

Flexible tubes 120 can each be secured to a distal end of a respective cable receptacle 130. In some variations, the flexible tube 120 can be secured to the respective cable receptacle 130 at the distal end using a flexible adhesive such as an epoxy-based adhesive or a urethane-based adhesive. The flexible adhesive can bond a respective flexible tube 120 to respective cable receptacle 130. In other variations, the flexible tube 120 can be secured to the respective flexible tube 120 at the distal end by at least one of a fastener mechanism, a tongue and grove mechanism, or a screw mechanism. Flexible tubes 120 can also include a longitudinal opening 125 that can accept a cable such as an electrical cable or a pneumatic cable such as those used in measuring Non-Invasive Blood Pressure (NIBP). Flexible tubes 120 can be secured to cable receptacles 130 such that the longitudinal opening 125 of flexible tube 120 aligns with the longitudinal opening 135 of cable receptacle 130. Such alignment allows for a cable to be placed within each combination of a cable receptacle 130 and a flexible tube 120. Flexible tubes 120 can be oriented in a customizable, organized manner to facilitate organizing of a plurality of cables encapsulated by both flexible tubes 120 and cable receptacles 130. Flexible tubes 120 can be oriented either before, during, or after the plurality of cables are placed within longitudinal openings 125, 135.

Flexible tubes 120 can be made of a polypropylene material that allows for an initial configuration by a user of flexible tube 120. Based on the material properties of flexible tubes 120, such configuration can be maintained by each flexible tube 120 so as to orient the plurality of cables in a customized, organized manner. To further assist with cable management of the plurality of cables, in some variations, each flexible tube 120 can be color coded based on a type of parameter information transmitted by each respective cable (e.g., ECG, blood pressure, pulse oximetry, body temperature, respiration rate/information, etc.). Additionally, each flexible tube 120 can be of length ranging from about 1 meter to 3 meters (e.g., 1 meter, 1.5 meters, 1.75 meters, 2 meters, 2.5 meters, 2.85 meters, 3 meters). Such length can be based upon the particular application environment of the cable management system 100.

Figure 2A:
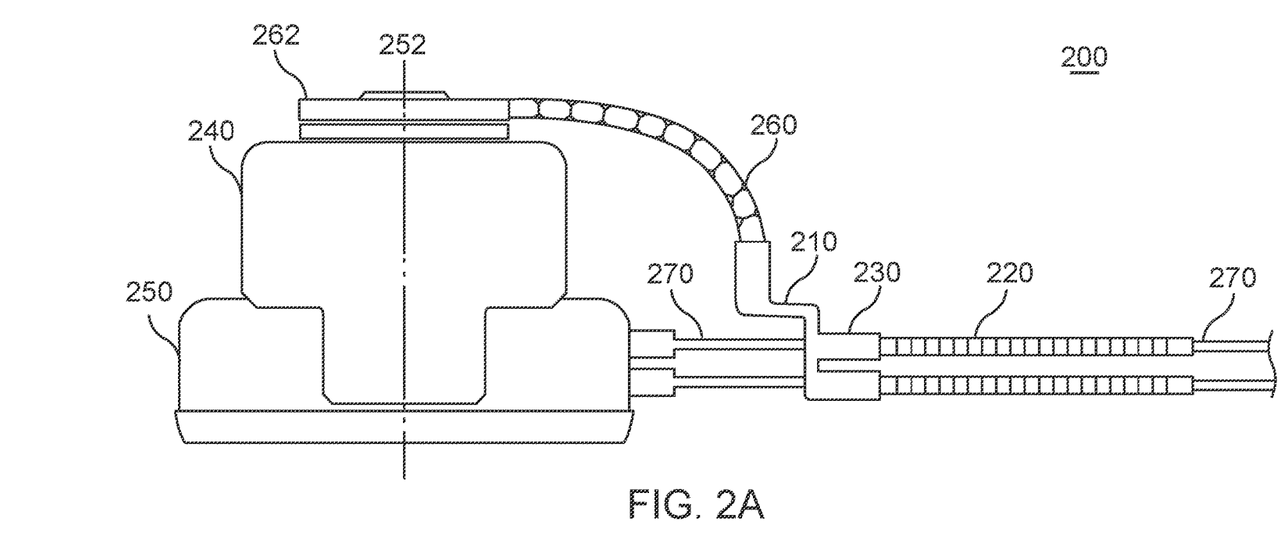
FIG. 2A illustrates a top view of an example discrete cable management system.

FIG. 2A is a top view of an example discrete cable management system 200. Cable management system 200 can include a rigid housing 210, a plurality of flexible tubes 220, a plurality of cable receptacles 230, a mount 240, a patient monitoring device 250, a flexible arm 260, and a plurality of cables 270. The example discrete cable management system 200 includes two rows of cables 270. Flexible arm 260 can be coupled to the rigid housing 210. As illustrated in FIG. 2A, flexible arm 260 is located between rigid housing 210 and mount 240. Mount 240 can be coupled to a patient monitoring device 250 via a mounting interface 262 secured to flexible arm 260. In some variations, mount 240 can be a monitor mount designed to receive and detachably couple to patient monitoring device 250. While attached to mounting interface 262, flexible arm 260 can provide mobility of a range of approximately 90 degrees for rigid housing 210 and the plurality of flexible tubes 220 coupled thereto about a center axis 252 of the patient monitoring device 250. Flexible arm 260 and mounting interface 262 can provide for ambidextrous use of the cable management system 200 by allowing for a 180 degree rotation to position rigid housing 210 on a right side or a left side of the mount 240. As illustrated in FIG. 2A, flexible arm 260 is configured to position rigid housing 210 on a right side of patient monitoring device 250, when facing the patient monitoring device 250.

The plurality of cables 270 can be coupled to patient monitoring device 250. Such cables 270 can be encapsulated by cable receptacles 230 and flexible tubes 220. The plurality of cables 270 can include electrical cables and/or pneumatic cables such as those used in measuring NIBP. Rigid housing 210 assists in maintaining the coupling between the plurality of cables 270 and patient monitoring device 250 before, during, and/or after initial positioning of the plurality of flexible tubes 220. While the cable orientation of the plurality of cables 270, as illustrated in FIG. 2A, forms a uniform, straight-line orientation, each individual flexible tube 220 can be positioned in any manner within a three-dimensional plane so as to provide for organization of the plurality of cables 270.

Figure 2B:
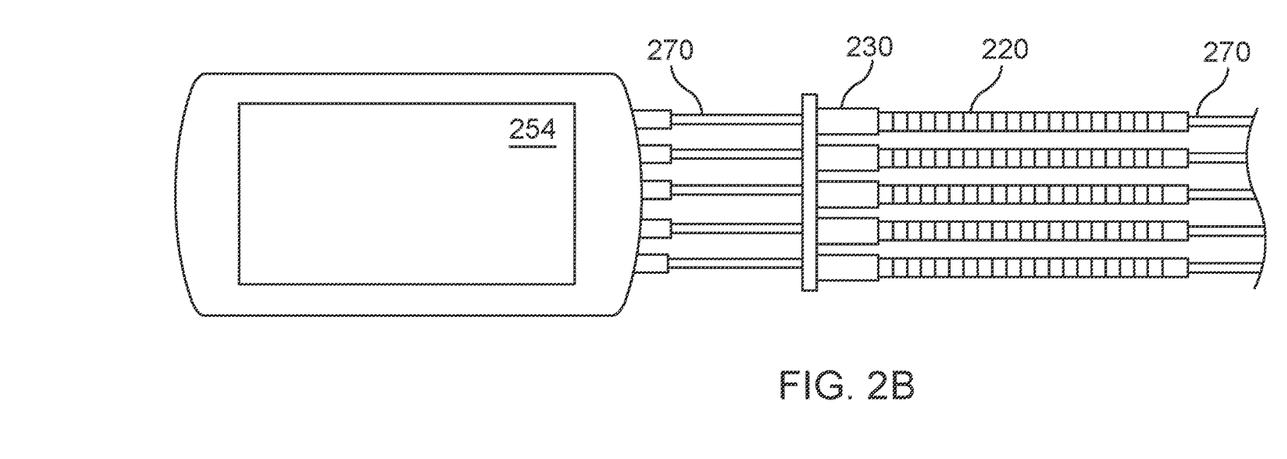
FIG. 2B illustrates a front view of the example discrete cable management system of FIG. 2A.

FIG. 2B is a front view of the example cable management system of FIG. 2A. It is noted that the second row of cables 270 illustrated in FIG. 2B are not shown in FIG. 2A. Patient monitoring device 250 can include an electronic visual display 254 which is described in more detail in FIG. 5.

Figure 3:
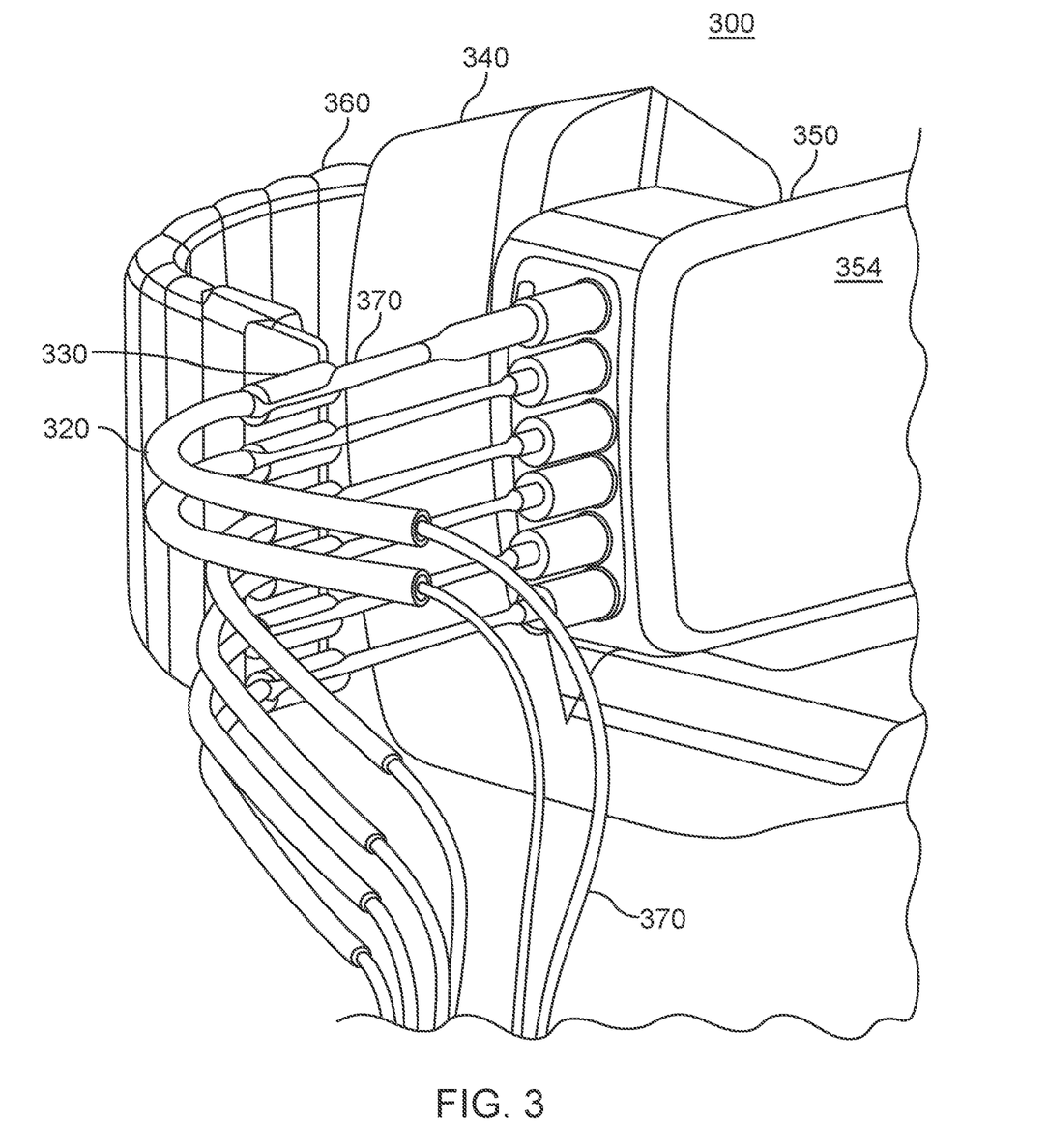
FIG. 3 illustrates a partial perspective view of a variation of the discrete cable management system of FIG. 2A.

FIG. 3 illustrates a partial perspective view of a variation 300 of the discrete cable management system 200 of FIG. 2A. Variation 300 can include a rigid housing 310, a plurality of flexible tubes 320, a plurality of cable receptacles 330, a mount 340, a patient monitoring device 350, a flexible arm 360, and a plurality of cables 370. Patient monitoring device 350 can include an electronic visual display 354 which is described in more detail in FIG. 5. Mount 340 can be coupled to a patient monitoring device 350 via a mounting interface (not shown) secured to flexible arm 360. In some variations, mount 340 can be a monitor mount designed to receive and secure patient monitoring device 350. As illustrated in FIG. 3, cable receptacles 330 form a single, straight row down a perimeter of rigid housing 310. Flexible tubes 320 secured within cable receptacles 330 are each positioned to form various angles.

Figure 4:
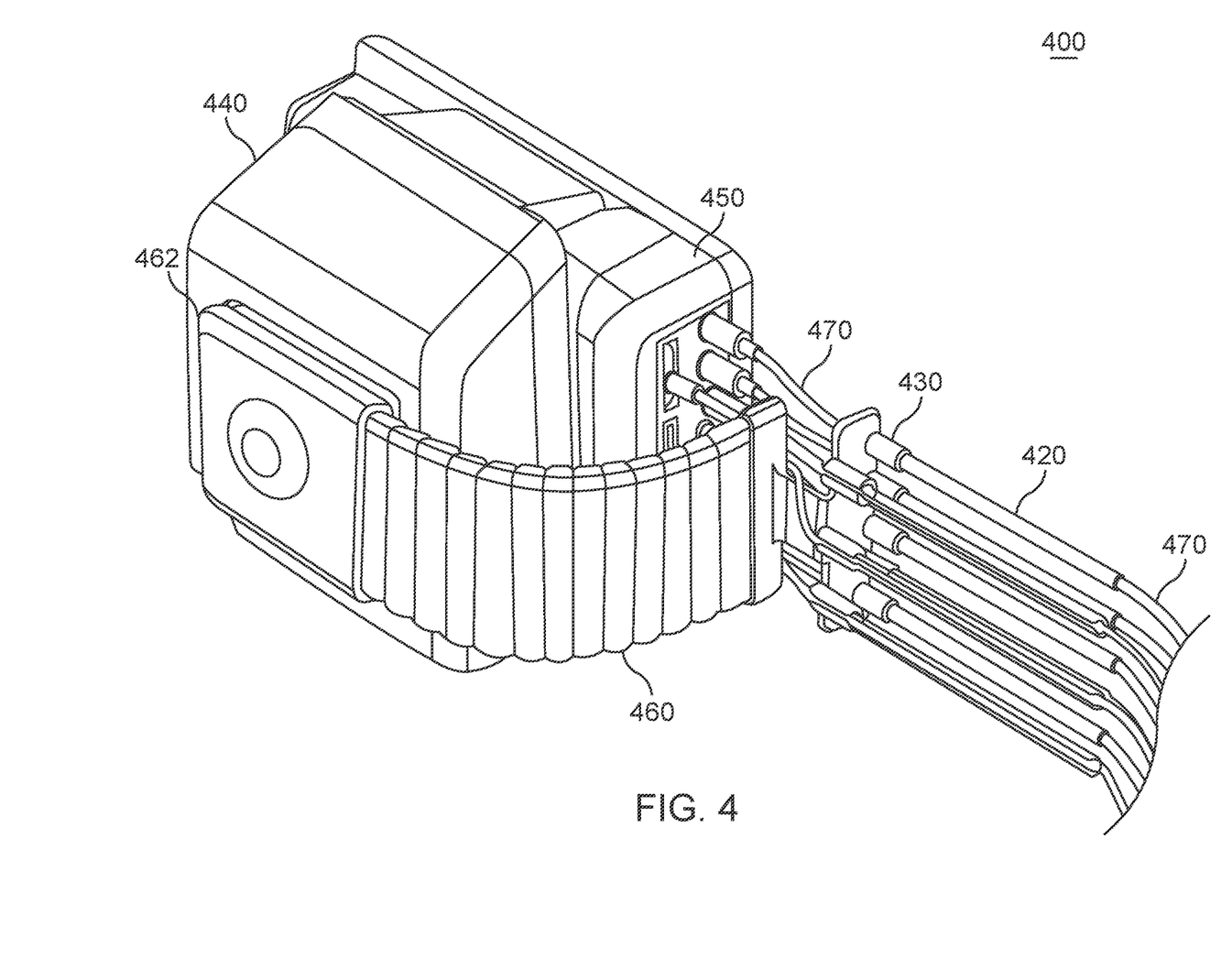
FIG. 4 illustrates a rear perspective view of a variation of the discrete cable management system of FIG. 2A.

FIG. 4 illustrates a rear perspective view of a variation 400 of the discrete cable management system 200 of FIG. 2A. Variation 400 can include a rigid housing 410, a plurality of flexible tubes 420, a plurality of cable receptacles 430, a mount 440, a patient monitoring device 450, a flexible arm 460, and a plurality of cables 470. Mount 440 can be detachably coupled to a patient monitoring device 450 via a mounting interface 462 secured to flexible arm 360. In some variations, mount 440 can be a monitor mount designed to receive and secure patient monitoring device 450. As illustrated in FIG. 4, cable receptacles 430 form two rows down two perimeters of rigid housing 410.

Figure 5:
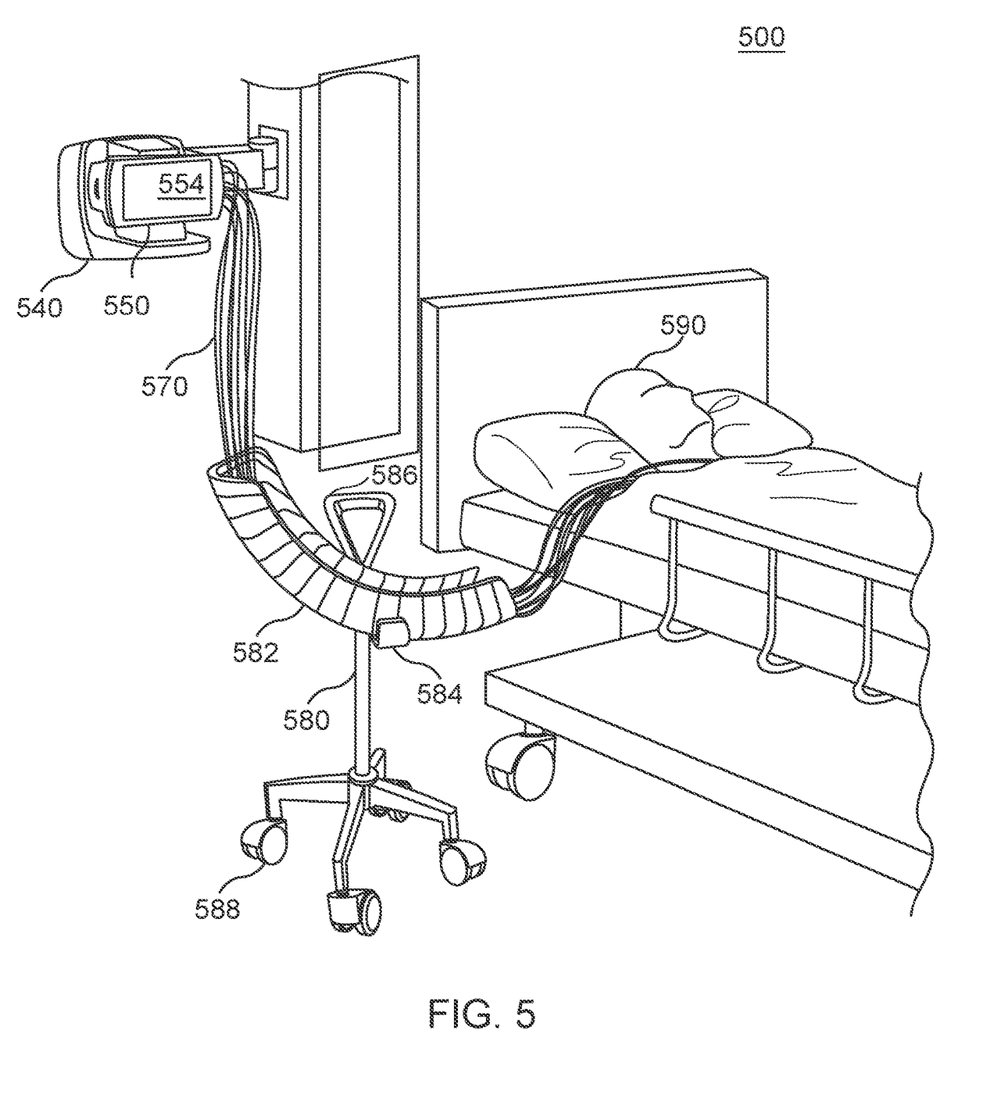
FIG. 5 illustrates an example patient environment 500 for an example mobile cable management system.

FIG. 5 illustrates an example patient environment 500 for an example mobile cable management system. Patient environment 500 can include a plurality of cables 570 coupled between a patient 590 and a patient monitoring device 550. The plurality of cables 570 can exit the patient monitoring device 550 on either the left side or right side, when facing the patient monitoring device 550, in a horizontal plane relative to a floor of the patient environment 500. Absent a cable management system (either discrete or mobile) the plurality of cables 570 can be draped across other equipment within patient environment 500 (not shown) that is directly below patient monitoring device 550 and/or in close proximity to patient monitoring device 550. As illustrated in FIG. 5, use of a mobile cable management system can direct the plurality of cables 570 away from the patient monitoring device 550 towards patient 590 in a manner that avoids disorganized and/or draped cables 570 over other equipment within patient environment 500.

In some variations, a mobile cable management system can include a vertical stand structure 580 and a deformable trough 582. Deformable trough 582 can be initially bent by a user in a customizable manner to form a customized configuration. Once in a customized configuration, deformable trough 582 can subsequently maintain the customized configuration to facilitate placement of the plurality of cables 570 within the deformable trough 582. In the customized configuration, deformable trough 582 can form a channel having a bottom and at least two sides to facilitate placement of cables 570 within the channel as described in detail below FIG. 6. In some variations, vertical stand structure 580 can include a mounting arm 584. Mounting arm 584 can extend perpendicular to vertical stand structure 580. Deformable trough 582 can be secured to mounting arm 584 as described in detail below.

Vertical stand structure 580 can maneuver about a floor of patient environment 500. Vertical stand structure 580, in some variations, can include an integrated handle 586 attached to vertical stand structure 580 at a first end. Integrated handle 586 can facilitate maneuvering about the floor of patient environment 500 by providing a structure for a user to grip and/or steer maneuvering of vertical stand structure 580. In some variations, vertical stand structure 580 can also include a plurality of wheels 288 at a second end of the vertical stand structure 580 to further facilitate maneuvering about the floor of patient environment 500 such as an anesthesia work environment.

Patient monitoring devices 250, 350, 450, 550 can be used to monitor various physiological parameters for a patient 590. Such physiological parameters can be transmitted between patient 590 and patient monitoring device 550, for example, via the plurality of cables 570. With such a variation, patient monitoring devices can 250, 350, 450, 550 include a sensor interface that can connect via wired and/or wireless interfaces to one or more physiological sensors and/or medical devices (e.g., ECG electrodes, $SPO_2$ sensor, blood pressure cuffs, apnea detection sensors, respirators, etc.) associated with the patient 590. Patient monitoring devices 250, 350, 450, 550 can include one or more processors (e.g., programmable data processors, etc.) which can execute various instructions stored in memory of the patient monitoring devices 250, 350, 450, 550. Patient monitoring devices 250, 350, 450, 550 can additionally include a communications interface which allows the patient monitoring devices 250, 350, 450, 550 directly or indirectly to access one or more computing networks. The communications interface can include various network cards/interfaces to enable wired and wireless communications with such computing networks. The communications interface can also enable direct (i.e., device-to-device, etc.) communications (i.e., messaging, signal exchange, etc.).

As previously described, patient monitoring devices 250, 350, 550 can include an electronic visual display 254, 354, 554, respectively. Various data and graphical user interfaces can be conveyed to a user via electronic visual display 254, 354, 554. This information can, for example, relate to the measured physiological parameters of a patient 590 transmitted across one or more of the plurality of cables 270, 370 and the like (e.g., blood pressure, heart related information, pulse oximetry, respiration information, etc.). Other types of information can also be conveyed by the electronic visual display 254, 354, 554. In some variations, the electronic visual display 254, 354, 554 includes a touch screen interface.

Figure 6:
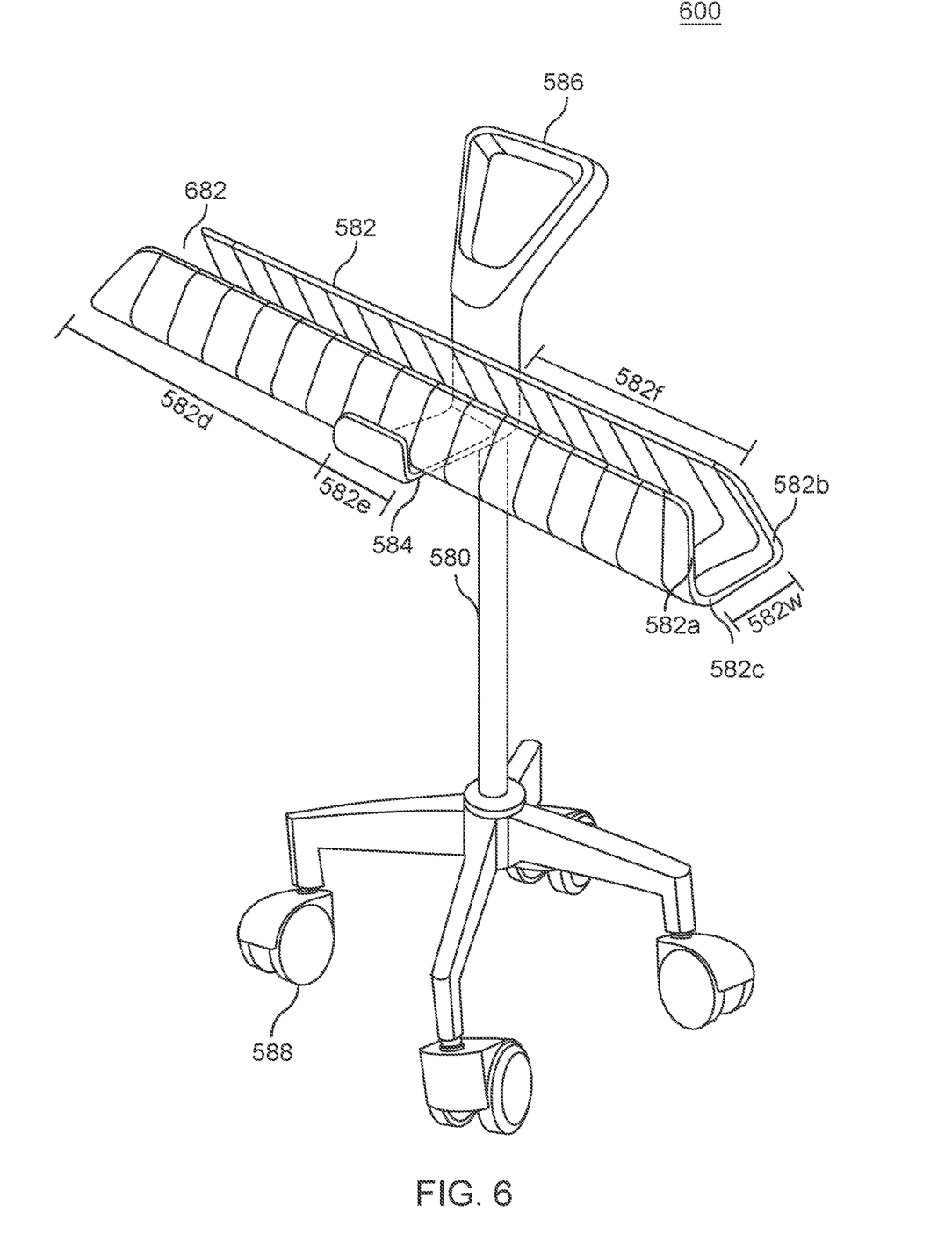
FIG. 6 illustrates an example customized configuration of deformable trough of the example mobile cable management system.

FIG. 6 illustrates an example customized configuration 600 of deformable trough 582 of a mobile cable management system. Deformable trough 582 can be configurable due to its material such as a polypropylene material. Deformable trough 582 can include sides 582a, 582b and a bottom 582c. Sides 582a, 582b and bottom 582 can form a customized channel 682. Customized channel 682 can be customized to provide for a customized channel width 582w. Customized channel 682 can be formed by initially bending sides 582a, 582b into the customized configuration 600. Deformable trough 582 can also include a first portion 582d, a middle portion 582e, and a second portion 582f. The first portion 582d the second portion 582f can each be individually configured to form the customized configuration 600. Middle portion 582e can be affixed to mounting arm 584 to secure deformable trough 582 to vertical stand structure 580. Middle portion 582e can remain stationary when the first portion 582d and/or the second portion 582f are being configured.

Figure 7:
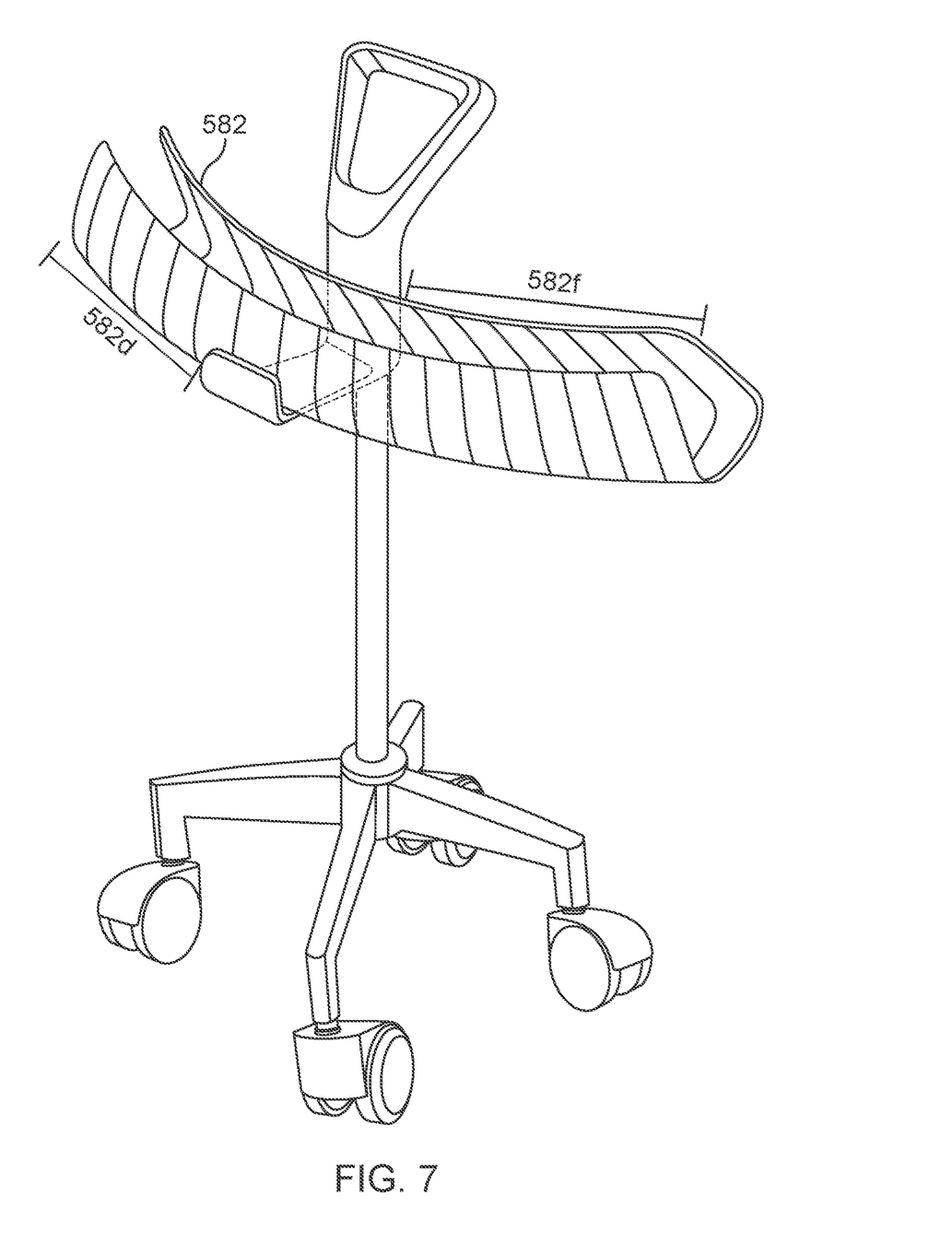
FIG. 7 illustrates another example customized configuration of deformable trough of the example mobile cable management system.

FIG. 7 illustrates another example customized configuration 700 of deformable trough 582. As illustrated in FIG. 7, the first portion 582d and the second portion 582f can be bent in an upwardly, curved configuration.

Figure 8:
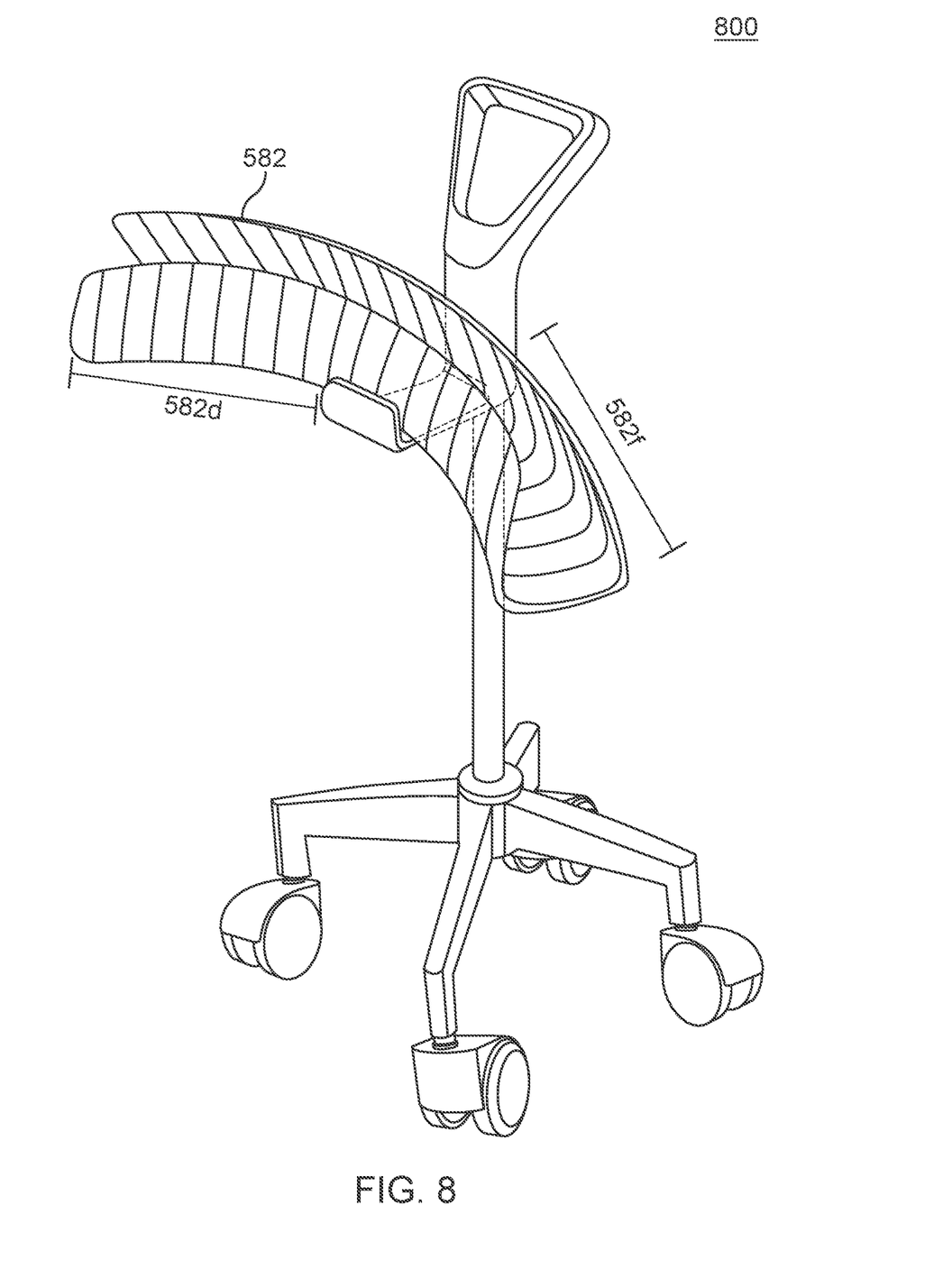
FIG. 8 illustrates another example customized configuration of deformable trough of the example mobile cable management system.

FIG. 8 illustrates another example customized configuration 800 of deformable trough 582. As illustrated in FIG. 8, the first portion 582d and the second portion 582f can be bend in an inwardly, curved configuration.

While the example configurations in FIGS. 6-7 illustrate deformable trough 582 having the first portion 582d and second portion 582f bent in the same direction, it can be appreciated that the first portion 582d and second portion 582f can also be bent in two different directions to form a customized configuration.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A cable management system for use with a patient monitor having a central axis extending horizontally and parallel to a floor of a patient environment, and a plurality of cables extending therefrom, the system comprising:
   at least one cable receptacle, each of the at least one cable receptacle formed of a tubular outer wall, the cable receptacle having a proximal end, a distal end, and a length therebetween, and defining a channel having a longitudinal opening formed therein, the channel adapted to receive at least one of the plurality of cables therein;
   a flexible tube affixed to an end of the at least one cable receptacle, the flexible tube defining a channel and adapted to retain the at least one of the plurality of cables therein, wherein the flexible tube is arranged to be positioned from an initial straight-line orientation to a curved orientation wherein the flexible tube curves about a vertical axis perpendicular to the floor of the patient environment, wherein the flexible tube is configured to maintain the curved orientation after being positioned thereto, wherein the flexible tube includes a longitudinal opening formed therein, the longitudinal opening aligned with the longitudinal opening of the cable receptacle;
   a patient monitor mount coupled to the patient monitor by a mounting interface, the patient monitor mount being positioned between the patient monitor and the mounting interface;
   an arm having a first end affixed to a rigid housing connected to only a portion of the tubular outer wall which is less than its length and a second end that is affixed to the mounting interface, the arm being adapted to support the at least one cable receptable in a spaced-apart relationship from the patient monitor and to enable a range of motion for the at least one cable receptacle about the central axis, and
   wherein the arm is articulable at a plurality of locations along its length.

2. The system of claim 1, wherein the mounting interface is positioned behind and affixed to the patient monitor mount.

3. The system of claim 1, wherein the mounting interface is adapted to enable rotation of the arm relative to the mounting interface, thereby enabling the at least one cable receptacle to be selectively positioned on a left side and a right side of the patient monitor mount.

4. The system of claim 1, wherein the mounting interface is adapted to enable 180 degree rotation of the arm relative to the patient monitor mount, thereby enabling the at least one cable receptacle to be selectively positioned on a left side and a right side of the patient monitor mount.

5. The system of claim 1, wherein the arm is continuously flexible over its length.

6. The system of claim 1, wherein the arm is affixed to a middle portion of the at least one cable receptacle.

7. The system of claim 1, wherein the at least one cable receptacle consists of a plurality of cable receptacles, each being adapted to receive a single cable of the plurality of cables.

8. The system of claim 1, wherein the flexible tube extends downwardly towards the floor of the patient environment as it curves about the vertical axis.

9. The system of claim 1, wherein the flexible tube is color coded based on the type of parameter information transmitted by the at least one of the plurality of cables retained therein.

10. A cable management system for use with a patient monitor having a plurality of cables extending therefrom, the system comprising:
   a cable receptacle formed of an open channel having a proximal end, a distal end, and a length therebetween, the open channel having a floor and at least two walls that approach each other as they extend upwardly from the floor to form a longitudinal opening on an upper side of the cable receptacle to facilitate placement of the plurality of cables within the open channel, the floor and at least two walls of the open channel configured to deform between a straight configuration and a curved configuration and to retain the straight or curved configuration after deformation wherein the curved configuration is either an upwardly curved configuration or an inwardly curved configuration; and
   a support structure comprising an arm that is secured to only a portion of the open channel which is less than its length the support structure being adapted to support the cable receptable in a spaced-apart relationship from the patient monitor and to enable the cable receptacle to be positioned at a plurality of distances from the patient monitor.

11. The system of claim 10, further comprising an arm mount to which a second end of the arm is attached.

12. The system of claim 10, wherein the support structure comprises a vertical stand structure and the arm extends perpendicular to the vertical stand structure.

13. The system of claim 12, additionally comprising a handle extending from the vertical stand structure.

14. The system of claim 12, additionally comprising a plurality of wheels extending from the vertical stand structure.

15. The system of claim 10, wherein the arm is affixed to a middle portion of the at least one cable receptacle.

16. The system of claim 10, wherein the channel further comprises a bottom and at least two sides.

* * * * *